(12) United States Patent
Shibao

(10) Patent No.: US 6,968,930 B2
(45) Date of Patent: Nov. 29, 2005

(54) DAMPER

(75) Inventor: Masaharu Shibao, Barcelona (ES)

(73) Assignee: Nifco Inc., Yokohama (JP)

( * ) Notice: Subject to any disclaimer, the term of this patent is extended or adjusted under 35 U.S.C. 154(b) by 42 days.

(21) Appl. No.: 10/454,509

(22) Filed: Jun. 5, 2003

(65) Prior Publication Data

US 2004/0032068 A1    Feb. 19, 2004

(30) Foreign Application Priority Data

Aug. 19, 2002    (JP)    .............................. 2002-237986

(51) Int. Cl.⁷ ................................................ F16F 9/36
(52) U.S. Cl. ............... 188/322.17; 267/196; 267/64.11
(58) Field of Search ...................... 188/322.16, 322.17, 188/271; 267/196, 134, 64.11, 64.12; 16/66

(56) References Cited

U.S. PATENT DOCUMENTS

| | | | | |
|---|---|---|---|---|
| 3,284,841 A | * | 11/1966 | Patriquin ....................... 16/52 |
| 4,309,027 A | * | 1/1982 | Molders et al. ............. 267/124 |
| 4,629,167 A | * | 12/1986 | Kimura et al. .............. 267/226 |
| 4,760,621 A | * | 8/1988 | Stromquist ..................... 16/85 |
| 4,765,444 A | * | 8/1988 | Bauer et al. ................ 188/129 |
| 4,948,103 A | * | 8/1990 | Bowden et al. ............... 267/34 |
| 5,697,477 A | * | 12/1997 | Hiramoto et al. ....... 188/322.18 |
| D413,508 S | * | 9/1999 | Shibao ........................ D8/382 |
| 6,325,187 B1 | * | 12/2001 | Boucher ................ 188/322.17 |
| 6,460,839 B2 | * | 10/2002 | Muller ....................... 267/221 |

* cited by examiner

Primary Examiner—Xuan Lan Nguyen
(74) Attorney, Agent, or Firm—Manabu Kanesaka

(57) ABSTRACT

A damper includes a cylinder, and a piston rod inserted into the cylinder through an opening portion of the cylinder. The piston rod includes front and base ends, and a frictional engaging member provided on an outer surface along a longitudinal direction thereof extending from a front end side toward the base end. A resistance device is disposed at the opening portion of the cylinder. The resistance device contacts the frictional engaging member and deforms elastically to provide frictional resistance to the piston rod as the piston rod is withdrawn from the cylinder.

8 Claims, 11 Drawing Sheets

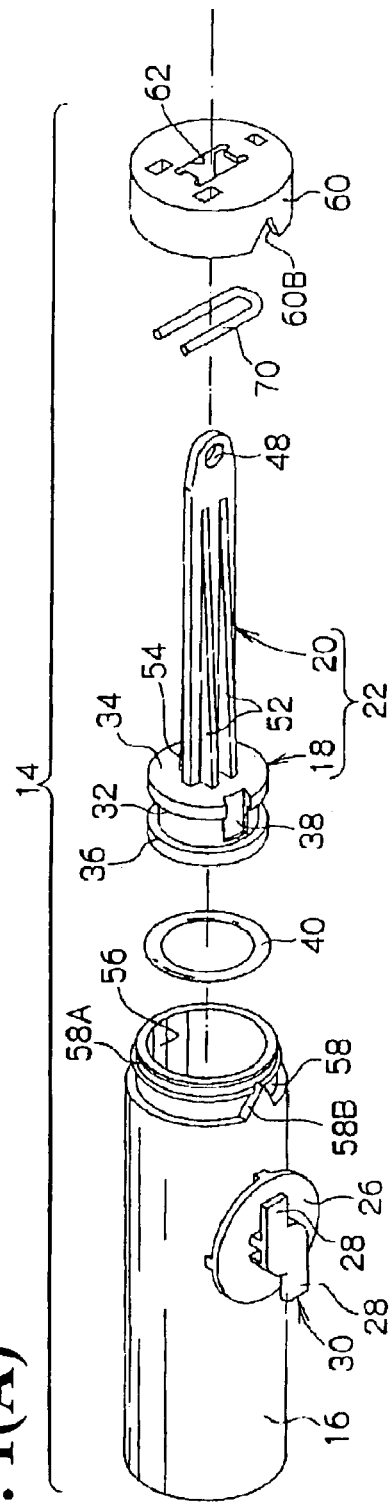
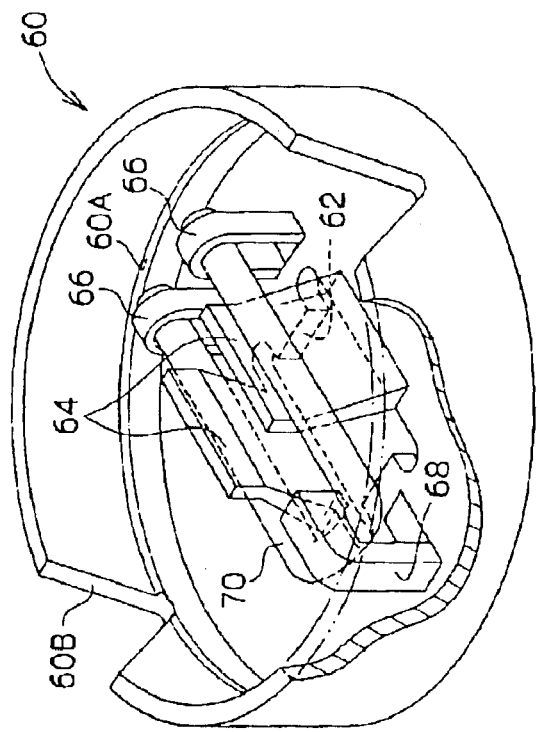
Fig. 1(A)
Fig. 1(B)

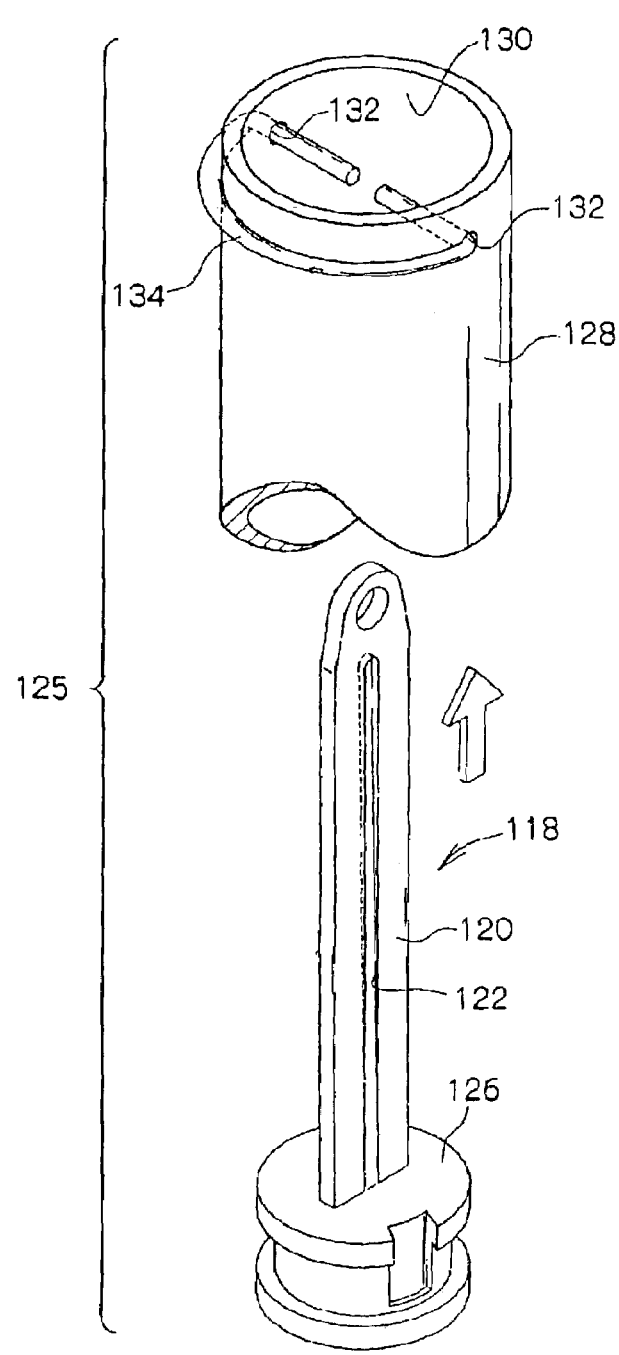
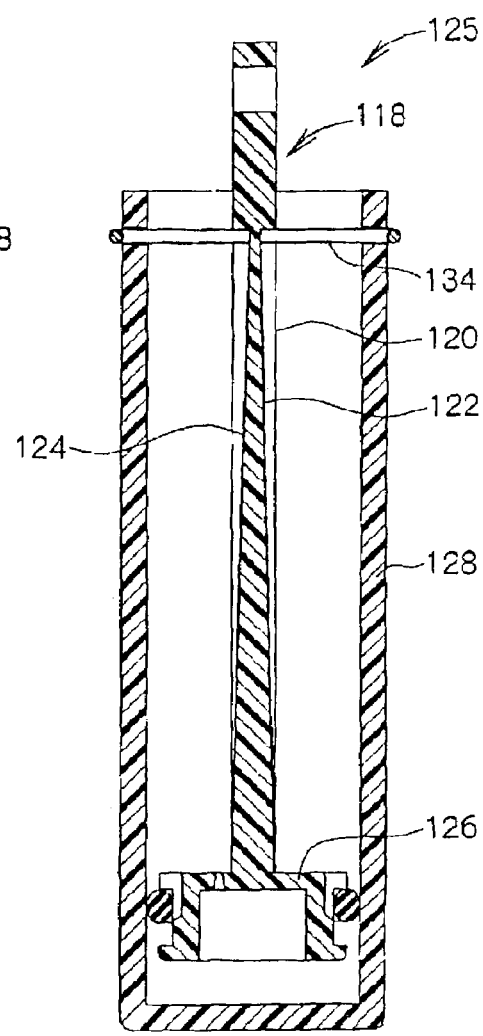
Fig. 9(A)
Fig. 9(B)

DAMPER

BACKGROUND OF THE INVENTION AND RELATED ART STATEMENT

The present invention relates to a damper having a simple configuration and a compact size.

A damper is used for, for example, a glove box, etc. provided inside a vehicle. When a lid of the glove box is opened, the damper controls the lid to rotate at an appropriate speed.

For example, in Japanese Patent Publication (Tokkai) No. 2002-5213, a damper 200 shown in FIG. 11 includes a cylinder 202 with an open end. A cover member 206 having a through-hole 204 at the center thereof is fitted in the open end.

A piston rod 212 formed of a piston 208 and a shaft 210 is placed in the cylinder 202, and is able to move along an axis direction of the cylinder 202. The piston rod 212 is disposed on an axis same as that of the cylinder 202, and has a length so that an end part of the shaft 210 is exposed from the cylinder 202 through the through-hole 204 when the piston 208 is situated at a bottom of the cylinder 202. The end part of the shaft 210 is attached to the lid of the glove box (not shown), and the piston rod 212 moves inside the cylinder 202 when the lid opens and closes.

A depressed part 214 is formed on an outer circumferential face of the piston 208 along a periphery of the piston 208. A seal ring 216 is fitted in the depressed part 214. The seal ring 216 contacts an inner circumferential face of the cylinder 202 to produce frictional resistance between the inner circumferential face of the cylinder 202 and the seal ring 216 when the piston rod 212 moves, hereby obtaining a damper effect.

A coil spring 218 is disposed around the outer circumferential face of the shaft 210. One end part of the coil spring abuts against the cover member 206, and the other end part thereof abuts against a top face of the piston 208. When the piston 208 is moved toward the cover member 206, the coil spring 218 is compressed in the direction against the urging force thereof and assists the damper effect.

A pair of vibration prevention rockers 220, 222 is projected on the outer circumferential face of the shaft 210 along the axial direction of the shaft 210 to prevent the coil spring 218 from vibrating when the coil spring 218 is compressed.

The coil spring 218 is provided between the piston 208 and the covering member 206. Accordingly, it is necessary to provide a space for the coil spring 218 in a state where the piston 208 is located in a position closest to the covering member 206, thereby making it difficult to reduce a size of the cylinder 202. Further, the covering member 206 for holding the coil spring 218 is necessary, thus it is difficult to reduce the number of the parts.

The present invention has been made in view of the problems described above, and an object of the present invention is to provide a damper having a compact size with a simple configuration.

Further objects and advantages of the invention will be apparent from the following description of the invention.

SUMMARY OF THE INVENTION

According to the first aspect of the present invention, a damper includes a cylinder; a piston rod inserted into the cylinder and guided by the cylinder; an inclining part provided along the piston rod with an increasing height in a direction opposite to a direction that the piston rod is pulled-out from the cylinder; and a resistance member disposed at an opening for providing frictional resistance to the piston rod through a contact with the inclining part while elastically deforming.

In the present invention, the inclining part is provided along the piston rod such that the height increases in the direction opposite to the direction that the piston rod is pulled-out from the cylinder. Further, the resistance member is provided for contacting the inclining part to obtain the frictional resistance against the piston rod while elastically deforming. Thus, the resistance member deforms elastically with an increasing force as the piston rod is pulled-out from the cylinder, so that the frictional resistance between the inclining part and the resistance member is gradually increased. Accordingly, in the damper of the invention, the damper effect increases as the piston rod moves in the cylinder toward the direction that the piston rod is pulled-out from the cylinder.

In a case where the damper is used for, for example, a glove box provided inside the vehicle, the cylinder is attached to the vehicle and an end of the piston rod is attached to a lid of the glove box. When the lid is open, the piston rod moves in the cylinder in the pulled-out direction.

The lid is locked to the vehicle through a locking device, and when the locking device is released, the lid rotates around a pivot and moves in an open direction by its own weight. At this time, the lid rotates in an increasing speed in proportion to an open angle. The piston rod moves in the direction that the piston is pulled-out from the cylinder, so that the damper effect on the lid gradually increases to offset the increasing rotational speed, thereby opening the lid slowly.

When the lid is closed, the piston rod moves in the direction opposite to the pulled-out direction from the cylinder. In other words, since the piston rod moves in the direction of reducing the damper effect, the lid part can be closed with little resistance.

As described above, the damper of the invention is provided with the inclining part along the piston rod with the height increasing in the direction opposite to the pulled-out direction of the piston rod from the cylinder. At the same time, the resistance member is provided for contacting the inclining part to apply the frictional resistance to the piston rod as the resistance member deforms elastically. Therefore, it is not necessary to provide a coil spring for assisting the damper effect, thereby reducing a size of the cylinder. Further, the piston rod moves in a state where the resistance member contacts the inclining part. Thus, the piston rod moves without a jolt.

According to the second aspect of the present invention, the resistance member is formed of a spring member bridging the opening and sandwiching the inclining part from outside. Since the spring member bridges the opening, it is not necessary to provide a cover. Thus, the number of the parts and assembly work can be reduced, thereby reducing a cost.

According to the third aspect of the present invention, the piston rod is formed of a plate member, and the inclining part is formed in an inclined wall projecting from a surface of the plate member. The spring member is a U-shaped spring that expands when the piston rod moves and the inclined wall pushes the U-shaped spring. The U-shaped spring is inserted into a fixing hole formed in a peripheral wall of the cylinder to hold the inclined wall inside.

In the third aspect of the present invention, the inclined wall pushes the U-shaped spring to expand with the movement of the piston rod. Accordingly, the damper effect can be obtained through the elastic force of the U-shaped spring. The spring member is inserted into the fixing hole formed in the peripheral wall of the cylinder to prevent the spring member from falling off the cylinder.

According to the fourth aspect of the present invention, a damper includes a cylinder; a piston rod inserted into the cylinder and guided by the cylinder; an inclining part provided along the piston rod with a height increasing in a direction opposite to a direction that the piston rod is pulled-out from the cylinder; a cover fitted in an opening of the cylinder; a through-hole formed in the cover for inserting the piston rod; a pressure piece provided at an edge of the through-hole for contacting the inclining part; and a spring member attached to the cover for urging the pressure piece toward the inclining part.

In the fourth aspect, the cover is fitted in the opening of the cylinder. The cover is provided with the through-hole where the piston rod passes through, the pressure piece for contacting the inclining part, and the spring member for urging the pressure piece toward the inclining part. With this configuration, in addition to an elastic force of the pressure piece, the U-shaped spring applies an elastic force, so that the damper effect is increased. Also, since the inclining part does not directly contact the spring member, there is no squeaking sound through a contact between metal and plastic.

The spring contacts the pressure piece and elastically deforms. Therefore, the pressure piece receives a partial load to improve endurance against a cyclic stress, thereby obtaining a long life of the pressure piece, and preventing damage on the pressure piece.

According to the fifth aspect of the present invention, the piston rod and pressure piece are made of a synthetic resin. Accordingly, the piston rod and pressure piece have an improved durability and the damper has a longer life, as compared to, for example, metal. Also, as compared to metal, a cost can be reduced.

According to the sixth aspect of the present invention, a plurality of pressure pieces is provided and arranged to face each other so that the pressure pieces can support the piston rod. Accordingly, the piston rod does not wobble along a shaft thereof, thereby obtaining the stable damper effect when the piston rod moves.

According to the seventh aspect of the present invention, a damper includes a cylinder; a piston rod inserted into the cylinder and guided by the cylinder; a long hole formed in the piston rod in a longitudinal direction with a width decreasing in a direction opposite to a direction that the piston rod is pulled-out from the cylinder; and a resistance member disposed at an opening of the cylinder for inserting into the long hole to apply frictional resistance to the piston rod when the resistance member contacts a wall of the long hole to deform elastically.

In the seventh aspect, the long hole is formed in the piston rod in a longitudinal direction with the width decreasing in the direction opposite to the direction that the piston rod is pulled-out from the cylinder. The resistance member contacts the wall of the long hole to apply the frictional resistance to the piston rod when the resistance member elastically deforms.

BRIEF DESCRIPTION OF THE DRAWINGS

FIG. 1(A) is a partial exploded perspective view showing a configuration of a damper according to the first embodiment of the present invention, and FIG. 1(B) is a rear perspective view showing a cover member of the damper;

FIGS. 4(A) and 4(B) are drawings showing an operation of a glove box with the damper of the first embodiment of the present invention, wherein FIG. 4(A) shows a state where the lid is closed, and FIG. 4(B) shows a state where the lid is open;

FIGS. 5(A) and 5(B) are partial sectional views showing an modified example of the damper of the first embodiment of the present invention, wherein FIG. 5(A) shows a state where the piston rod is held in a bottom of the cylinder, and FIG. 5(B) shows a state where the piston rod is held in the middle of movement;

FIGS. 9(A) and 9(B) are views showing a modified example of the damper of the second embodiment of the present invention, wherein FIG. 9(A) is an exploded perspective view thereof, and FIG. 9(B) is a cross sectional view thereof;

DETAILED DESCRIPTION OF THE PREFERRED EMBODIMENTS

Figure 2:
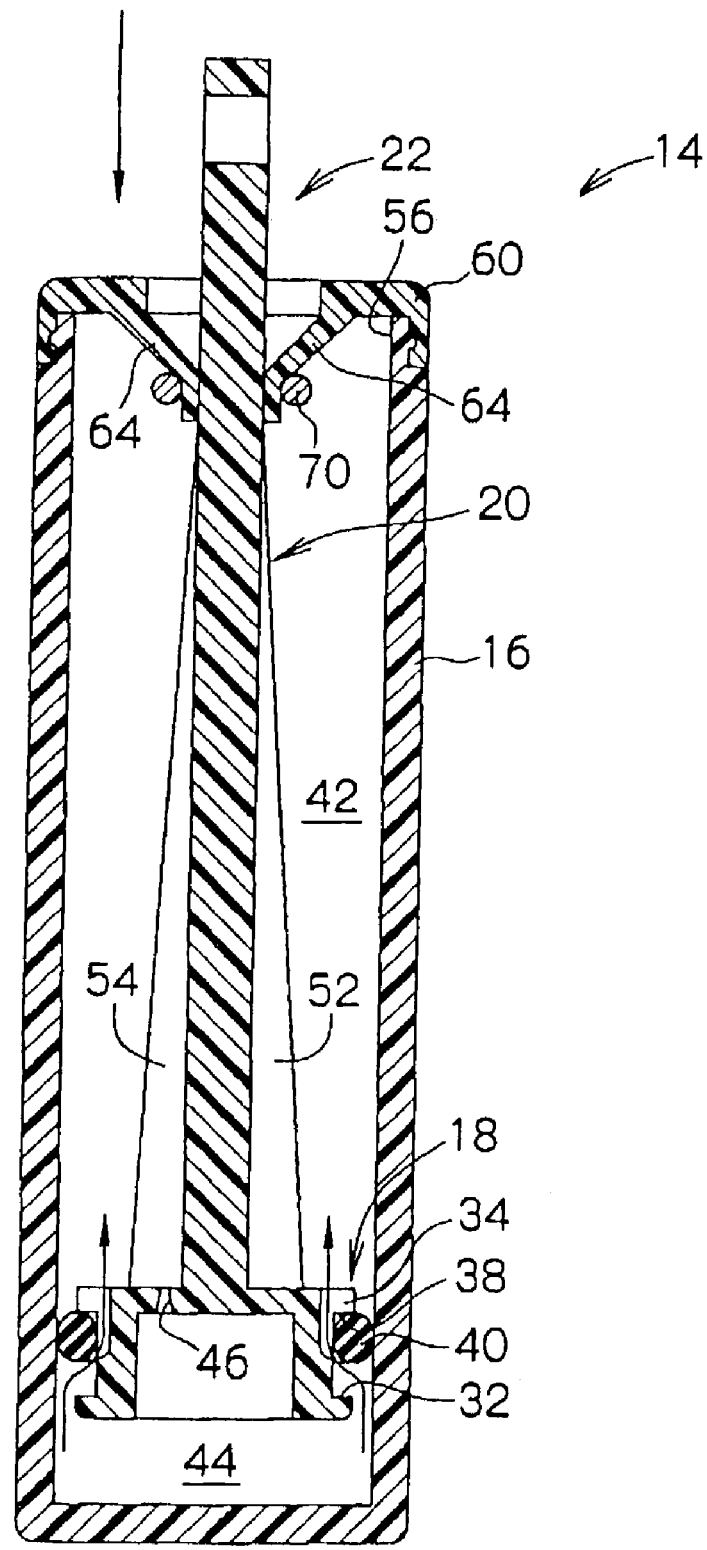
FIG. 2 is a partial sectional view showing the damper in a state where a piston rod moves to a bottom of a cylinder according to the first embodiment of the present invention.

Hereunder, embodiments of the present invention will be explained with reference to the accompanying drawings. A damper mechanism is provided in a glove box inside a vehicle for damping a movement of a lid of the glove box when the lid opens, so that the lid does not open rapidly.

A damper according to the first embodiment of the present invention will be explained. As shown in FIG. 1(A), a damper 14 is provided with a cylinder 16 having a substantially cylindrical shape. A piston rod 22 formed of a cylindrical piston 18 and a plate-like shaft 20 as a unit is inserted to be movable in the cylinder 16.

A circular plate 26 is attached to an outer circumferential face of the cylinder 16 with a space in between. An engagement part 30 is disposed on a top face of the circular plate 26, and has engagement pieces 28 extending each other in the opposite directions with shifted centerlines.

Figure 4A:
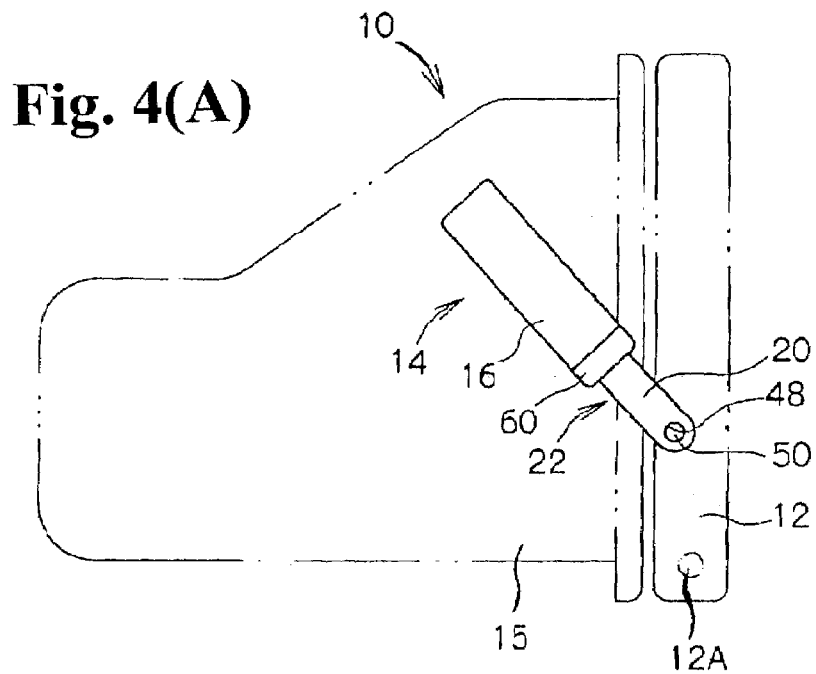

A glove box main member 15 (refer to FIG. 4(A)) is provided with a hole (not shown) for inserting the engagement part 30. When the engagement part 30 is inserted in the hole, the cylinder 16 is rotated to lock the engagement part 30. As a result, the cylinder 16 is fixed to the glove box main member 15 through the engagement part 30.

A depressed part 32 is provided on an outer circumferential face of the piston 18 of the piston rod 22 along a periphery of the piston 18. The piston 18 has two ends formed as flanges 34, 36.

The flange 34 is provided with a pair of orifices 38 extending from the depressed part 32 and having bottoms deeper than a bottom of the depressed part 32. A step is formed between the bottom of the orifice 38 and the bottom of the depressed part 32. A circular seal ring 40 with a width smaller than that of the depressed part 32 is inserted in the depressed part 32, so that the seal ring can move inside the depressed part 32 along an axial direction of the piston 18.

As shown in FIG. 2, the orifice 38 has a length so that the orifice is slightly exposed when the seal ring 40 moves toward the flange 34. In this state, air chambers 42, 44 inside the cylinder 16 divided by the piston 18 are communicated with each other through the orifices 38.

An orifice 46 with a passage narrower than the orifice 38 is formed in the flange 34 for allowing the air chambers 42, 44 to communicate with each other. The orifice 46 has a larger cross section at a side of the air chamber 42, so that air flows from the air chamber 42 to the air chamber 44 with resistance.

As shown in FIG. 1(A), the shaft 20 projects from a top face of the flange 34. The shaft 20 has a length so that a tip of the shaft 20 is exposed from the cylinder 16 in the state where the piston rod 22 is moved to an end of the cylinder 16. An attachment hole 48 is formed at the tip of the shaft 20, and the attachment hole engages an attachment part 50 (refer to FIG. 4(A)) provided on the lid 12 for fixing the piston rod 22 to the lid 12.

As shown in FIG. 2, a pair of inclining walls 52, 54 is provided on outer faces of the shaft 20, respectively. It is arranged that a distance between end faces of the inclining walls 52, 54 increases toward the piston 18 from the tip of the shaft 20.

As shown in FIG. 1(A), a small radius part 58 is formed on an outer circumferential face of the cylinder 16 at a side of the opening 56. A cover member 60 having a roughly cylindrical shape is fixed to the small radius part 58. An engagement part 60A is formed in an inner circumferential face of the cover member 60 (refer to FIG. 1(B)) for engaging a projection 58A projecting along a periphery of the small radius part 58. The engagement part 60A engages the projection 58A to fix the cover member 60 to the small radius part 58.

Notches 60B are formed on the peripheral wall of the cover member 60 for engaging positioning projection parts 58B formed in the small radius part 58. The notches 60B engage the positioning projected parts 58B, so that the cover member 60 is positioned relative to the small radius part 58.

As shown in FIGS. 1(A) and 1(B), a through-hole 62 having a substantially rectangular shape is formed at a center of the cover member 60 for inserting the shaft 20. A pair of pressure pieces 64 is formed on a backside of the cover member 60 at a peripheral edge of the through-hole 62 for contacting the inclining walls 52, 54 of the shaft 20 passing through the through-hole.

The pressure pieces 64 are arranged to incline in a direction so that end parts thereof come close to each other. Accordingly, a distance between the end parts of the pressure pieces 64 is smaller than that between base parts of the pressure pieces 64. Also, the distance between the end parts of the pressure pieces 64 is arranged such that the front end parts of the inclining walls 52, 54 formed on the outer face of the shaft 20 can contact. Thus, as the base part of the shaft 20 comes to enter the pressure pieces 64, the pressure pieces 64 are expanded outwardly.

A pair of supporting parts 66 having a substantially U-shape is formed on one side near a peripheral part of the through-hole 62 in a state where both end parts of the supporting parts 66 are fixed to the rear face of the cover member 60. A supporting part 68 having a substantially L-shape is formed on the other side of the through-hole 62 with the pressure pieces 64 in between, in a state where an end face of the supporting part 68 faces between the supporting parts 66.

A spring 70 with a U-shape is provided in the supporting parts 66, 68, for supporting. An arc side of the spring 70 engages the supporting part 68, and end parts of the spring pass through the supporting parts 66, so that the spring contacts the pressure pieces 64.

A width between holes of the supporting parts 66 is larger than a width of linear portions of the spring 70. Accordingly, when the pressure pieces 64 elastically deform, the end parts of the spring 70 move away from each other.

Figure 3:
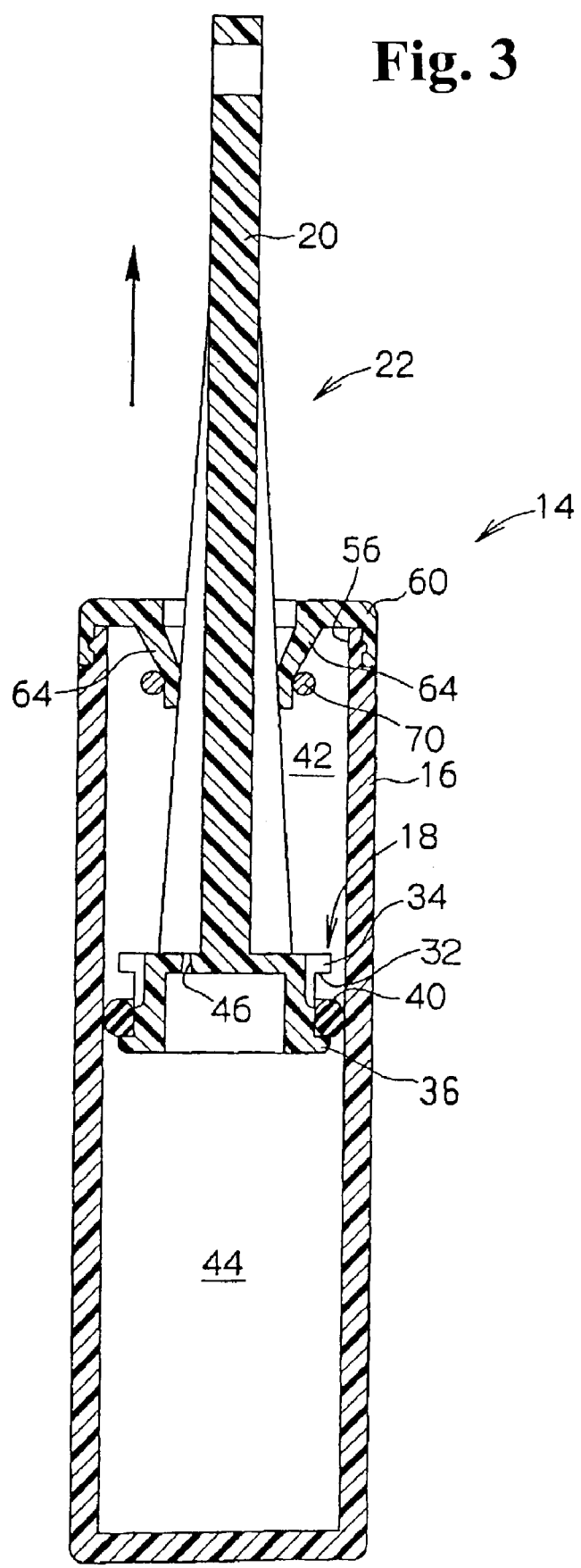
FIG. 3 is a partial sectional view showing the damper in a state where the piston rod moves in a pulled-out direction according to the first embodiment of the present invention.

An operation of the damper according to the present embodiment will be explained next. As shown in FIG. 3, when the piston rod 22 is pulled out of the cylinder 16, due to the frictional resistance relative to the inner circumferential face of the cylinder 16, the seal ring 40 moves inside the depressed part 32 of the piston 18 toward the flange 36, and abuts against the flange 36.

In this state, the seal ring 40 abuts against the bottom face of the depressed part 32 along the periphery direction, and also abuts against the inner circumferential face of the cylinder 16. Therefore, air in the air chamber 42 of the cylinder 16 divided by the piston 18 does not pass through a gap between the outer circumferential face of the piston 18 and the inner circumferential face of the cylinder 16. Instead, air flows into the air chamber 44 through the orifice 46.

Also, as the piston rod 22 is pulled out of the cylinder 16, the distance between the end faces of the inclining walls 52 and 54 becomes larger. Therefore, the pressure pieces 64 are elastically deformed away from each other as the end faces of the inclining walls 52, 54 push the pressure pieces 64. Further, the spring 70 is pushed and spread through the pressure pieces 64, thereby accumulating an elastic force in the pressure pieces 64 and the spring 70.

On the other hand, as shown in FIG. 2, when the piston rod 22 moves toward the end of the cylinder 16, due to the frictional resistance relative to the inner circumferential face of the cylinder 16, the seal ring 40 is moved inside the depressed part 32 of the piston 18 toward the flange 34, and abuts against the flange 34.

In this state, a part of the seal ring 40 is located over the orifices 38. The orifice 38 has a length so that the orifice is slightly exposed even in the state where the seal ring 40 is moved to the flange 34, so that the air chambers 42 and 44 communicate through the orifice 38.

As the piston rod 22 moves to the end of the cylinder 16, the distance between the end faces of the inclining walls 52 and 54 becomes smaller, so that the spring 70 returns to the original state by the restoring force of the pressure pieces 64.

Figure 4B:
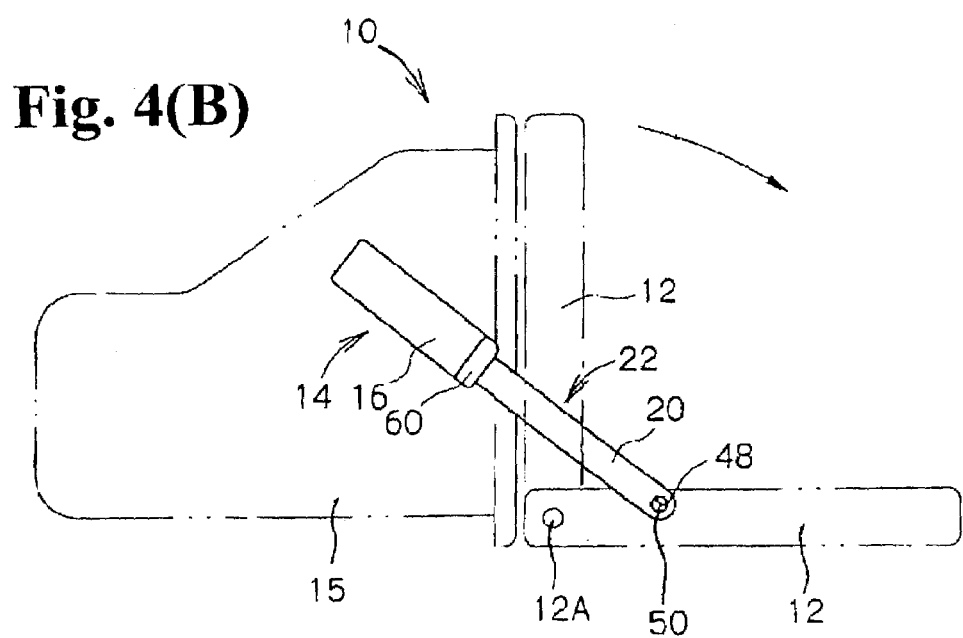

Next, a function of the damper according to the present embodiment will be explained. As shown in FIG. 3 and FIGS. 4(A)–4(B), the engagement part 30 (refer to FIG. 1(A)) formed on the outer circumferential face of the cylinder 16 is inserted in the hole (not shown) formed on the glove box main member 15. Then, the cylinder 16 is turned, and the damper 14 is fixed to the glove box main member 15 through the engagement part 30.

The attachment hole 48 formed on the tip of the shaft 20 of the piston rod 22 engages the attachment part 50 provided on the lid 12 of the glove box 10, and the piston rod 22 is fixed to the lid 12.

When the lid 12 is opened in this state, the seal ring 40 moves inside the depressed part 32 of the piston 18 due to the frictional resistance relative to the inner circumferential face of the cylinder 16, and abuts against the flange 36. When the lid 12 is opened further in this state, the seal ring 40 moves while sliding on the inner circumferential face of the cylinder 16. Accordingly, additional frictional resistance is generated between the inner circumferential face of the flange 34 and the seal ring 40, and the damper effect is obtained.

Air in the air chamber 42 of the cylinder 16 moves to the air chamber 44 through the orifice 46. The orifice 46 has the enlarged cross section area at a side of the air chamber 42 for providing the flow resistance against the air flowing from the air chamber 42 to the air chamber 44, thereby obtaining the damper effect.

Furthermore, the inclining walls 52, 54 are provided on the outer faces of the shaft 20 of the piston rod 22, and the distance between the end faces of the inclining walls 52, 54 is widened toward the piston 18. The pressure pieces 64 are provided for contacting the inclining walls 52, 54 to provide the frictional resistance to the piston rod 22 as the pressure pieces 64 elastically deform.

With this configuration, when the piston rod 22 is pulled out of the opening 56 of the cylinder 16, the large elastic force is accumulated in the pressure pieces 64, and the frictional resistance between the inclining walls 52, 54 and the pressure pieces 64 is gradually increased. Accordingly, when the piston rod 22 moves, the damper effect is increased.

The spring 70 contacts the pressure pieces 64 to provide the elastic force of the spring 70 in addition to the elastic force of the pressure pieces 64, so that the damper effect is further increased. Also, the pressure pieces 64 are disposed between the inclining walls 52, 54 and the spring 70, so that no squeak noise is generated through contact between metal and resin.

Furthermore, the spring 70 contacts the pressure pieces 64 and elastically deforms together. Accordingly, the pressure pieces 64 receive partial load to endure the repeated stress, so that the pressure pieces 64 can have a longer life, and damage of the pressure pieces 64 can be prevented.

As shown in FIGS. 4(A)–(B), the lid 12 is fixed to the glove box main member 15 by the locking device (not shown). When the locking device is released, the lid 12 turns around a pivot 12A to open by its own weight. At this time, as shown in FIG. 3, with the damper effect due to the frictional resistance between the inner circumferential face of the cylinder 16 and the seal ring 40 and the flow resistance of air passing through the orifice 46, the lid 12 is opened quietly.

When the piston rod 22 is pulled-out toward the opening 56 of the cylinder 16, the frictional resistance between the pressure pieces 64 and the inclining walls 52, 54 is generated to gradually increase the damper effect. Thus, the rotational speed of the lid 12 does not increase with an open angle, and the lid 12 is opened slowly.

When the lid 12 is closed, as shown in FIG. 2, due to the frictional resistance relative to the inner circumferential face of the cylinder 16, the seal ring 40 is moved inside the depressed part 32 of the piston 18 toward the flange 34, and abuts against the flange 34. In this state, the air chambers 42 and 44 are communicated through the orifices 38, and the air in the air chamber 42 mainly flows to the air chamber 44 through the orifices 38. Thus, the flow resistance of the air is reduced, so that the flow resistance does not increase the damper effect greatly.

When the piston 18 of the shaft 20 moves toward the end of the cylinder, the inclining walls 52, 54 of the shaft 20 contact the pressure pieces 64 as the distance between the end faces of the inclining walls 52 and 54 is reduced. Therefore, the damper effect is decreased, and the lid is closed with small resistance.

As described above, the inclining walls 52, 54 are provided on the outer faces of the shaft 20 of the piston rod 22, and the distance between the end faces of the inclining walls 52, 54 is increased toward the piston 18 from the tip of the shaft 20. Further, the pressure pieces 64 are provided for contacting the end faces of the inclining walls 52, 54. As a result, the frictional resistance is provided to the piston rod 22 while the pressure pieces 64 are elastically deformed. Therefore, it is not necessary to provide a coil spring for generating the damper effect, thereby reducing the size of the cylinder 16. Also, the piston rod 22 moves in a state where the pressure pieces 64 contact the inclining walls 52, 54, thereby eliminating rattle noise accompanied by the movement of the piston rod 22.

The piston rod 22 and pressure pieces 64 may be formed of synthetic resin, so that durability can be improved and the life of the damper 14 can be extended as compared to, for example, the case where the piston rod 22 and pressure pieces 64 are made of metal. The cost can be reduced as compared to the case where they are made with metal.

The pair of the pressure pieces 64 is provided to support the piston rod 22, thereby preventing the piston rod 22 from wobbling perpendicular to an axial direction, so that the damper effect becomes stable when the piston rod 22 moves.

In the present invention, the damper effect is obtained through the frictional resistance to the piston rod 22. To obtain the effect, therefore, it is possible to provide the inclining wall on only one side of the outer face of the shaft 20 and one pressure piece for contacting the inclining wall.

In the present embodiment, the spring 70 is arranged to elastically deform through the pressure pieces 64. Alternatively, without the pressure pieces 64, the spring 70 may directly contact the end faces of the inclining walls 52, 54 of the shaft 20. Further, without providing the spring 70, only the pressure pieces 64 may be disposed.

Furthermore, the damper effect may be achieved by allowing the end faces of the inclining walls 52, 54 of the piston rod 22 to contact the pressure pieces 64 as soon as the locking device (not shown) of the lid 12 (refer to FIG. 4(A)) is released. The damper effect may be obtained from a halfway of opening the lid 12 by allowing the end faces of the inclining walls 52, 54 to contact the pressure pieces 64 from a predetermined angle, so that the damper effect is not generated up to the predetermined angle after the locking device of the lid 12 is released.

Figure 5A:
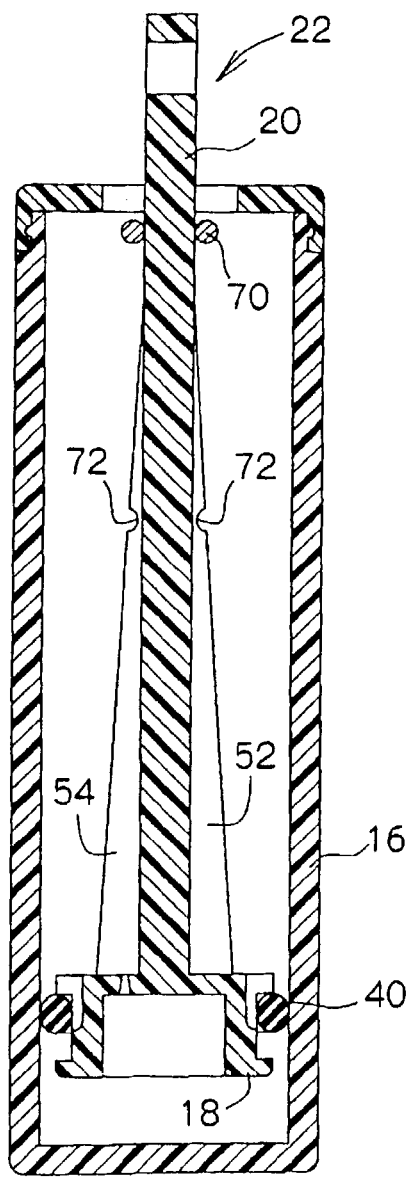
Figure 5B:
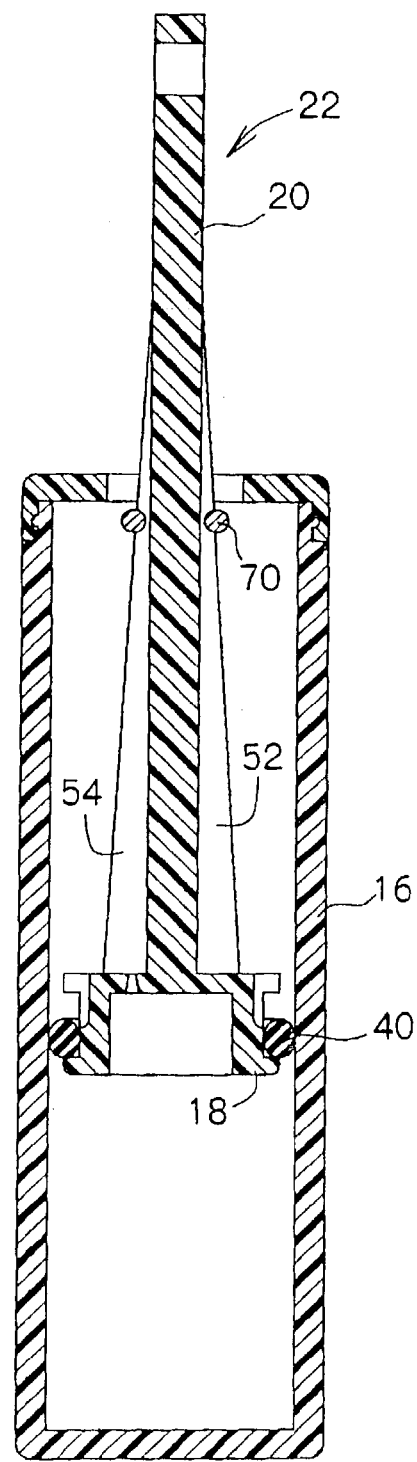

As shown in FIGS. 5(A)–5(B), the spring 70 may directly contact the inclining walls 52, 54. Depressed parts 72 may be provided on the end faces of the inclining walls 52, 54, so that the lid 12 can be kept open at an angle where the spring 70 engages the depressed parts 72 in addition to the fully open position of the lid 12.

As shown in FIG. 1(A), the shaft 20 has a plate shape. However, the shape of the shaft 20 is not limited to the plate shape as long as the pressure pieces 64 can deform in a different amount according to a position of the piston rod 22.

For example, the shaft may have a conical shape with a tip having a small diameter. The pair of the inclining walls 52, 54 is provided respectively on the both outer faces of the shaft 20. Alternatively, one inclining wall may be provided along an axis of the shaft on each outer face of the shaft.

Next, a damper according to the second embodiment of the present invention will be explained. The explanation regarding the same components as those of the damper of the first embodiment is omitted.

Figure 6:
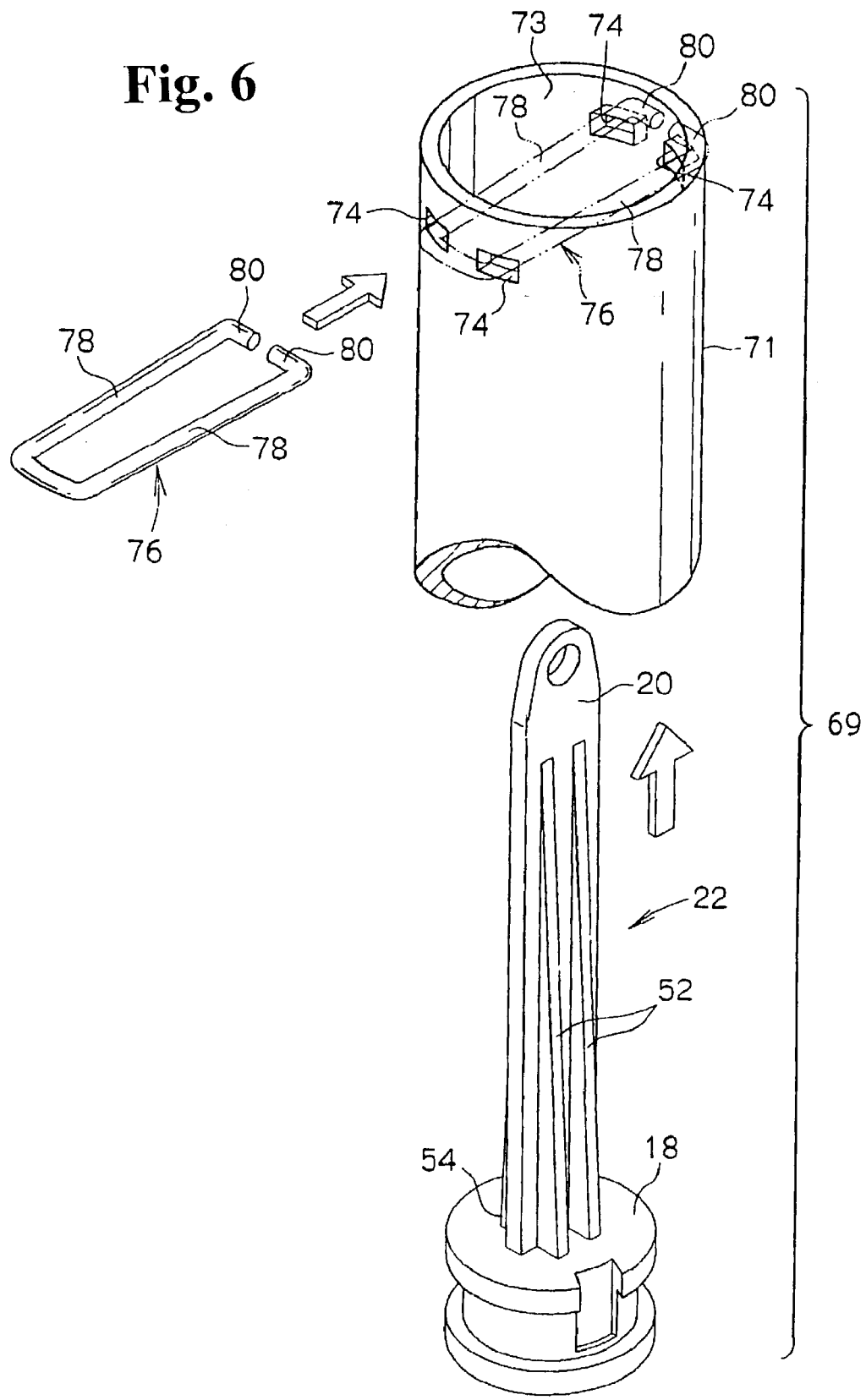
FIG. 6 is an exploded perspective view showing a damper according to the second embodiment of the present invention.

As shown in FIG. 6, a damper 69 is provided with two fixing holes 74 facing each other at an opening 73 of a cylinder 71. A spring 76 having a substantially U-shape is inserted into the fixing holes 74. A distance between leg parts 78 of the spring 76 has a specific width so that the end faces of the inclining walls 52, 54 of the piston rod 22 described in the first embodiment contact the spring 76.

The spring 76 is provided with hooks 80 having bent ends facing each other at ends thereof, and the fixing holes 74 have a specific size to receive the hooks 80. When the spring 76 is inserted into the fixing holes 74 and placed over the opening 73 of the cylinder 71, a gap is created between the spring 76 and the fixing holes 74, so that the leg parts 78 of the spring 76 can be expanded.

When the piston rod 22 passes through the cylinder, the leg parts 78 of the spring 76 are gradually pushed to expand as moving toward the piston 18 from the tip of the piston rod 22, thereby generating frictional resistance to the piston rod 22.

In this manner, since the spring 76 is placed over the opening 73, it is not necessary to provide a cover. Thus, it is possible to reduce the number of the parts as well as the steps for assembly, thereby reducing the cost.

Figure 7:
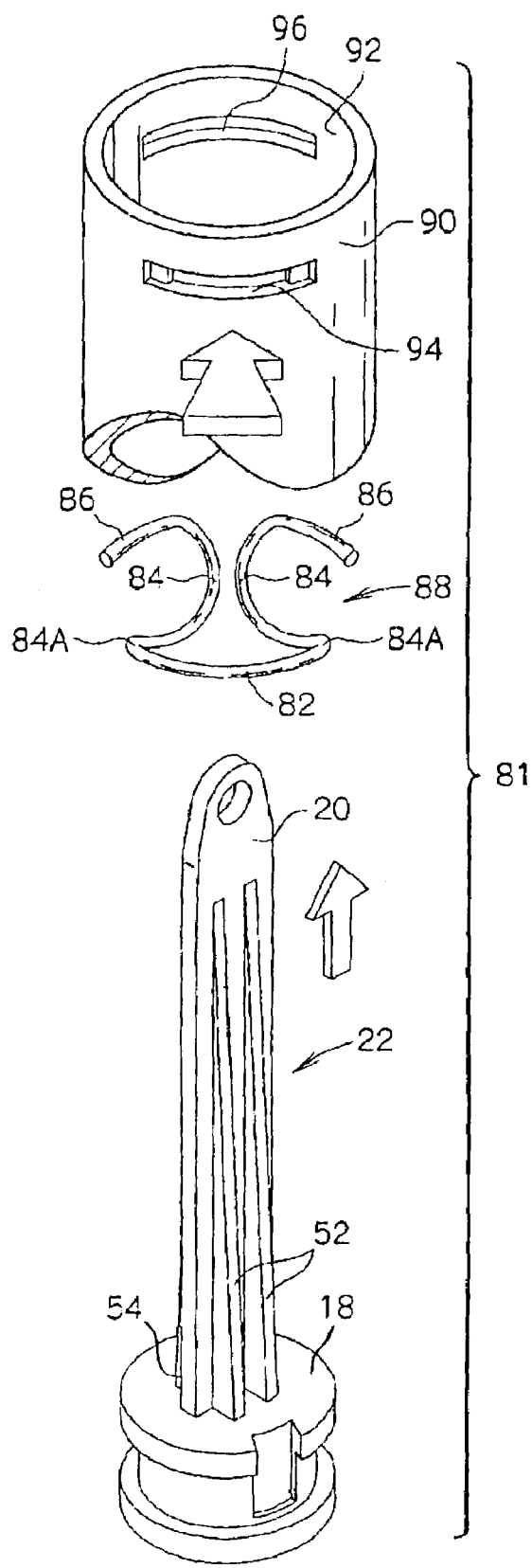
FIG. 7 is an exploded perspective view showing a modified example of the damper of the second embodiment of the present invention.

The spring 76 is placed over the opening 73 of the cylinder 71. However, it is not limited to the spring 76 as long as an elastic material may be placed over the opening 73 of the cylinder 71, and contact the end faces of the inclining walls 52, 54 of the piston rod 22. As shown in FIG. 7, for example, a damper 81 is provided with a spring 88. The spring 88 has an arc part 82 at a central portion thereof, and both sides of the arc part 82 are bent to come close to each other. In addition, the spring 88 has contact parts 84 having a symmetrical circular shape and engagement parts 86 curved with ends extending away from each other.

A cylinder 90 is provided with a pair of fixing holes 94, 96 facing each other at an opening 92. Edges 84A of the arc part 82 of the contact parts 84 engage a periphery of the fixing hole 94. The fixing hole 96 has a specific size for receiving the engagement parts 86 to engage a periphery of the fixing hole 96. The spring 88 is disposed in a diametric direction of the cylinder 90, and engages to be able to move along the radial direction. In this state, the shaft 20 of the piston rod 22 passes through between the contact parts 84.

The spring member tends to creep due to the repeated stress. In this embodiment, however, the arc part 82 is provided with the contact parts 84 bending with the ends extending close to each other to increase a restoring force through the elastic deformation, thereby improving the life of the spring member.

Figure 8:
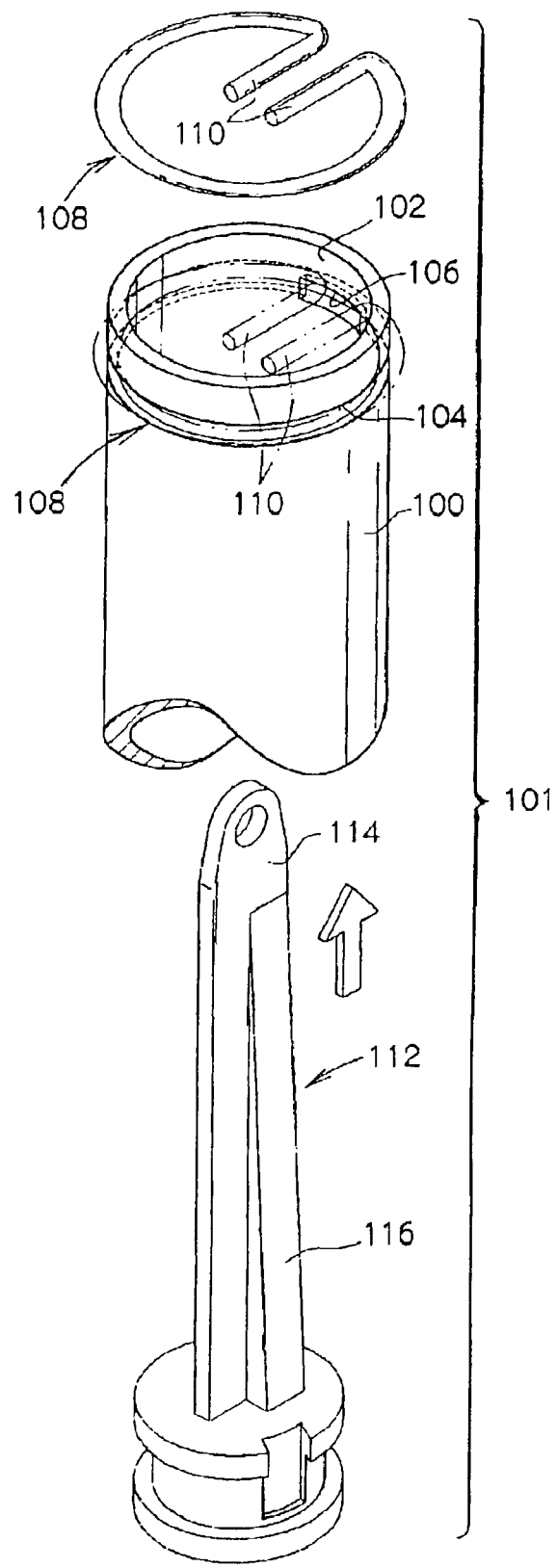
FIG. 8 is an exploded perspective view showing a modified example of the damper of the second embodiment of the present invention.

In an embodiment as shown in FIG. 8, a damper 101 is provided with a depressed part 104 along a periphery at an opening 102 of a cylinder 100, and a fixing hole 106 is formed in the depressed part 104. An arc-shaped spring 108 is disposed in the depressed part 104. The spring 108 is provided with contact parts 110 bending toward a center. After the spring 108 is inserted in the depressed part 104, the contact parts 110 are inserted into the fixing hole 106 to be located inside the cylinder 100.

An inclining wall 116 projects on a shaft 114 of a piston rod 112, and has a width larger than that of the inclining walls 52, 54 (refer to FIG. 7). The inclining wall 116 is provided on an outer face of the shaft 114 at a right side in the width direction in FIG. 8.

The inclining wall 116 is formed on one side of the shaft 114 to contact the contact parts 110. Thus, it is possible to minimize a length between the contact parts 110, and reduce an amount of bending of the contact parts 110 to prevent creep relaxation.

As shown in FIG. 2, the inclining walls 52, 54 are formed on the shaft 20, but it is not limited to the configuration in FIG. 2. As shown in FIGS. 9(A) and 9(B), a damper 125 is provided with groove portions 122, 124 on outer faces of the plate-like shaft 120 of the piston rod 118 along an axis direction. The groove portions 122, 124 have a depth gradually decreasing toward the piston 126 from the tip of the shaft 120. Accordingly, a distance between bottoms of the groove portions 122, 124 becomes larger toward the piston 126 from the tip of the shaft 120.

A pair of holes 132 is formed at an opening 130 of a cylinder 128. A spring 134 having a semicircular shape and a cut-off portion at the middle is disposed inside the cylinder 128 with both ends inserted in the holes 132. The ends of the spring 134 are separated and inserted into the groove portions 122, 124 of the shaft 120.

Each of the groove portions 122, 124 of the shaft 120 has a depth gradually deceasing from the tip of the cylinder 128 toward the piston rod 118. Accordingly, the ends of the spring 134 are pushed to expand outwards, so that the elastic force is accumulated, and the frictional resistance is applied to the piston rod 118, thereby obtaining the damper effect.

Figure 10:
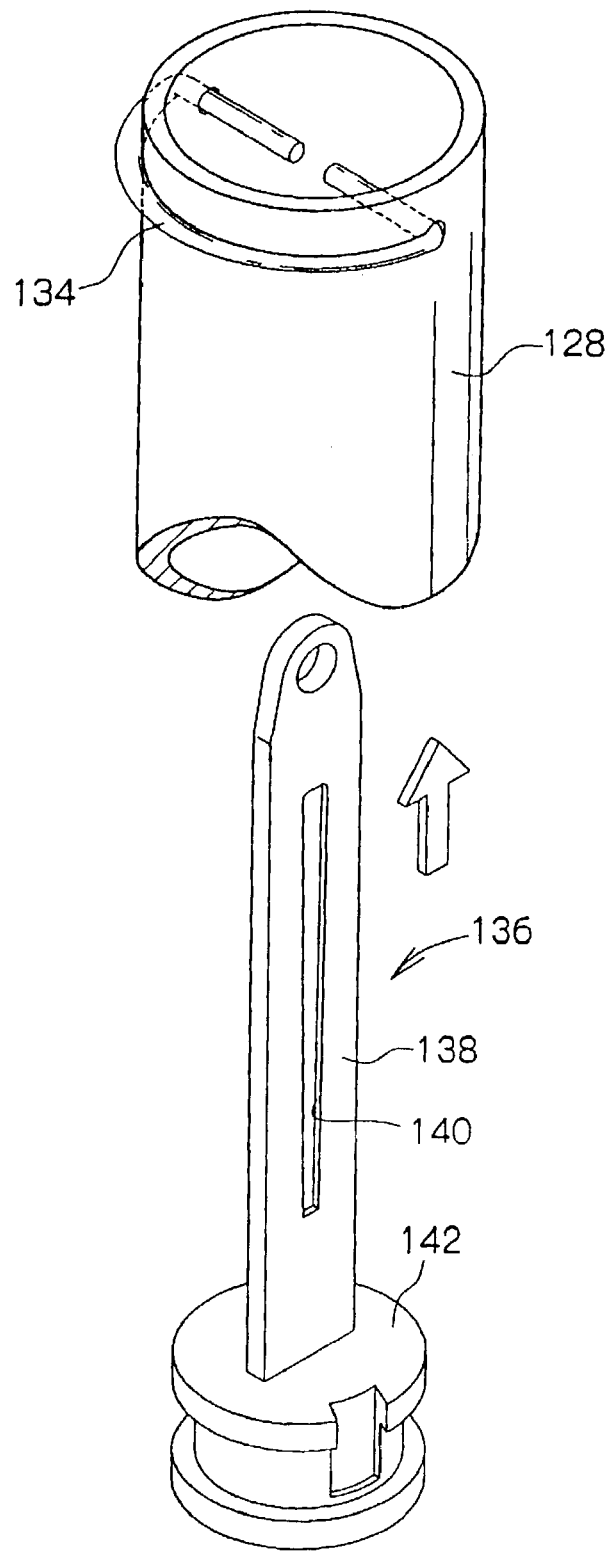
FIG. 10 is an exploded perspective view showing a modified example of the damper of the second embodiment of the present invention.
Figure 11:
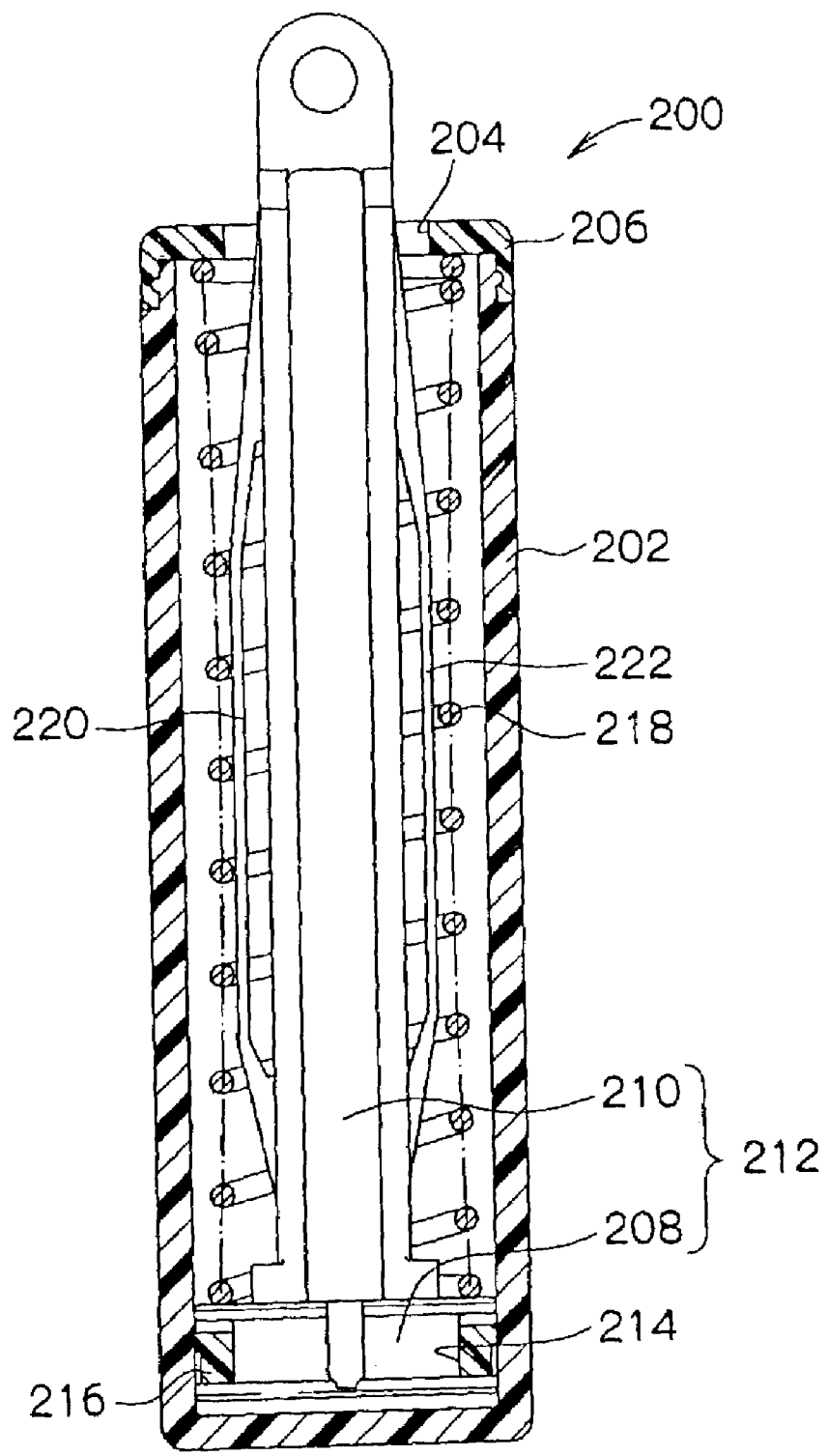
FIG. 11 is a cross sectional view showing a conventional damper.

Instead of the piston rod 118, it is possible to use a piston rod 136, as shown in FIG. 10. The piston rod 136 has a long hole 140 with a constant depth on both outer faces of the shaft 138 along the axis direction. The long hole 140 has a width gradually decreasing toward the piston 142 from the tip of the shaft 138. Since the long hole 140 of the shaft 138 has the width gradually decreasing toward the piston 142, the ends of the spring 134 contact sidewalls of the long hole 140 as well as a bottom face of the long hole 140. Thus, the frictional resistance is gradually increased, thereby increasing the damper effect accompanied by the movement of the piston rod 136.

In the present embodiments, the glove box main member 15 is explained, but the present invention is not limited to this. The invention is applicable to any member to be pulled out. Also, the movement is not limited to the rotational movement, and the invention is applicable to a linear movement for, for example, a cup holder or an ashtray, etc, provided inside a vehicle.

As described above, according to the present invention, it is not necessary to provide the coil spring for assisting the damper effect, thereby reducing the size of the cylinder. The piston rod moves in the state where the resistance member contacts the inclining part, thereby eliminating the noise associated with the movement of the piston rod.

According to the present invention, it is possible to reduce the number of the parts and the steps for assembly, thereby reducing the cost. The spring member may be inserted into the fixing hole formed on the peripheral of the cylinder, so that the spring member does not come off the cylinder.

In the present invention, the U-shaped spring is provided in addition to the pressure pieces, so that the damper effect can be increased. The inclining wall does not contact the spring member directly, thereby eliminating the squeaking noise due to the contact between metal and resin. In addition, the spring contacts the pressure pieces and deforms elastically, and the pressure pieces receive only partial load to endure the repeated stress, thereby improving the life of the pressure pieces and preventing the damage of the pressure pieces.

In the present invention, as compared to the case of the piston rod and pressure pieces made of metal, the damper is durable and has a longer life, as well as the cost is reduced. The piston rod is supported by the pressure pieces, thereby preventing the piston rod from wobbling perpendicular to the axis direction and obtaining the stable damper effect through the movement of the piston rod.

While the invention has been explained with reference to the specific embodiments of the invention, the explanation is illustrative and the invention is limited only by the appended claims.

What is claimed is:

1. A damper, comprising:

a cylinder having an opening portion, a piston rod inserted into the cylinder through the opening portion, and formed of a plate member with a plate surface, said plate member including a front end, a base end at a side opposite to the front end and having a flange projecting outwardly from the plate surface, and an inclining part as a frictional engaging member provided on the plate surface thereof along a longitudinal direction thereof extending from a portion near the front end to the base end, said inclining part having a height gradually increasing toward the base end, a cover fitted to the opening portion of the cylinder and having a through-hole for receiving the piston rod therethrough, and resistance means disposed at the opening portion of the cylinder, said resistance means being formed of a spring member with two spring portions at the opening and sandwiching the inclining part to contact the frictional engaging member and deform elastically to thereby gradually increase frictional resistance to the piston rod as the piston rod is withdrawn from the cylinder, said resistance means including a pressure piece provided at a side of the through-hole for contacting the inclining part, said spring member being attached to the cover for urging the pressure piece toward the inclining part.

2. A damper according to claim 1, wherein said inclining part pushes the spring portions to expand outwardly when the piston rod moves outside the cylinder.

3. A damper according to claim 1, further comprising a piston having said flange disposed at the base end of the piston rod for contacting an inner surface of the cylinder.

4. A damper according to claim 3, further comprising a sealing member, said piston including a circular groove around a periphery thereof for receiving the sealing member, and a step for forming a communication path between portions below and above the piston inside the cylinder, said sealing member being slidably disposed in the circular groove so that the sealing member closes the step to close the communication path when the piston is pulled outside the cylinder and the sealing member opens the step when the piston is pushed inside the cylinder.

5. A damper according to claim 1, wherein said piston rod and said pressure piece are formed of a synthetic resin.

6. A damper according to claim 1, wherein said pressure piece is formed of a plurality of pressure members facing each other.

7. A damper according to claim 1, wherein said inclining part extends from the flange in the longitudinal direction to extend a substantial portion of the plate member.

8. A damper according to claim 7, wherein said flange projects radially outwardly beyond the inclining part.

* * * * *